ns(12) United States Patent
Yoo et al.

(10) Patent No.: US 11,392,181 B2
(45) Date of Patent: Jul. 19, 2022

(54) ELECTRONIC DEVICE INCLUDING HINGE HOUSING HAVING CONDUCTIVE PATTERN FORMED THEREON

(71) Applicant: Samsung Electronics Co., Ltd., Gyeonggi-do (KR)

(72) Inventors: Jangsun Yoo, Gyeonggi-do (KR); Jihye Moon, Gyeonggi-do (KR); Myeonggil Lee, Gyeonggi-do (KR); Cheehwan Yang, Gyeonggi-do (KR); Kwangyong Lee, Gyeonggi-do (KR); Myoungkyu Lee, Gyeonggi-do (KR); Myoungjun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 16/704,164

(22) Filed: Dec. 5, 2019

(65) Prior Publication Data

US 2020/0183465 A1 Jun. 11, 2020

(30) Foreign Application Priority Data

Dec. 5, 2018 (KR) .................. 10-2018-0155308

(51) Int. Cl.
*G06F 1/16* (2006.01)
*H01Q 1/22* (2006.01)
*H01Q 1/48* (2006.01)
*H01Q 13/10* (2006.01)

(52) U.S. Cl.
CPC .......... *G06F 1/1683* (2013.01); *H01Q 1/2258* (2013.01); *H01Q 1/48* (2013.01); *H01Q 13/10* (2013.01)

(58) Field of Classification Search
CPC ........ H01Q 1/243; H01Q 13/10; H01Q 13/16; H01Q 1/2258; H01Q 1/2266; H01Q 9/42; G06F 1/1683; G06F 1/1616; G06F 1/1681; G06F 1/1698
See application file for complete search history.

(56) References Cited

U.S. PATENT DOCUMENTS

| 9,252,480 | B2 | 2/2016 | Chiu et al. |
| 9,401,539 | B2 | 7/2016 | Chiu et al. |
| 10,141,630 | B2 | 11/2018 | Kumar |
| 10,454,167 | B2 | 10/2019 | Yu et al. |
| 2004/0140934 | A1 | 7/2004 | Korva |

(Continued)

FOREIGN PATENT DOCUMENTS

EP 1439601 A1 7/2004

OTHER PUBLICATIONS

International Search Report dated Apr. 6, 2020.
European Search Report dated Oct. 12, 2021.

*Primary Examiner* — Ricardo I Magallanes
(74) *Attorney, Agent, or Firm* — Cha & Reiter, LLC

(57) ABSTRACT

In accordance with an aspect of the disclosure, an electronic device comprises a first housing, a second housing, a hinge housing disposed between the first housing and the second housing and containing a metallic material, a hinge structure, at least partially disposed in the hinge housing, wherein the hinge structure connects the first housing and the second housing to allow a selectable angle of rotation between the first housing and the second housing, and a conductive pattern formed on a surface of the hinge housing.

14 Claims, 10 Drawing Sheets

(56) References Cited

U.S. PATENT DOCUMENTS

| | | |
|---|---|---|
| 2009/0315788 A1 | 12/2009 | Hirota |
| 2012/0050975 A1* | 3/2012 | Garelli .................... H01Q 1/42 |
| | | 361/679.27 |
| 2015/0102966 A1 | 4/2015 | Chiu et al. |
| 2016/0099495 A1 | 4/2016 | Chiu et al. |
| 2018/0040942 A1* | 2/2018 | Lepe ................... H01Q 13/106 |
| 2018/0090840 A1* | 3/2018 | Yu ....................... H01Q 13/106 |
| 2018/0090850 A1 | 3/2018 | Lee et al. |
| 2018/0210499 A1* | 7/2018 | Tsubaki .................... E05D 3/12 |
| 2018/0254540 A1 | 9/2018 | Yoo et al. |
| 2018/0287241 A1* | 10/2018 | Kumar ................. G06F 1/1698 |

\* cited by examiner

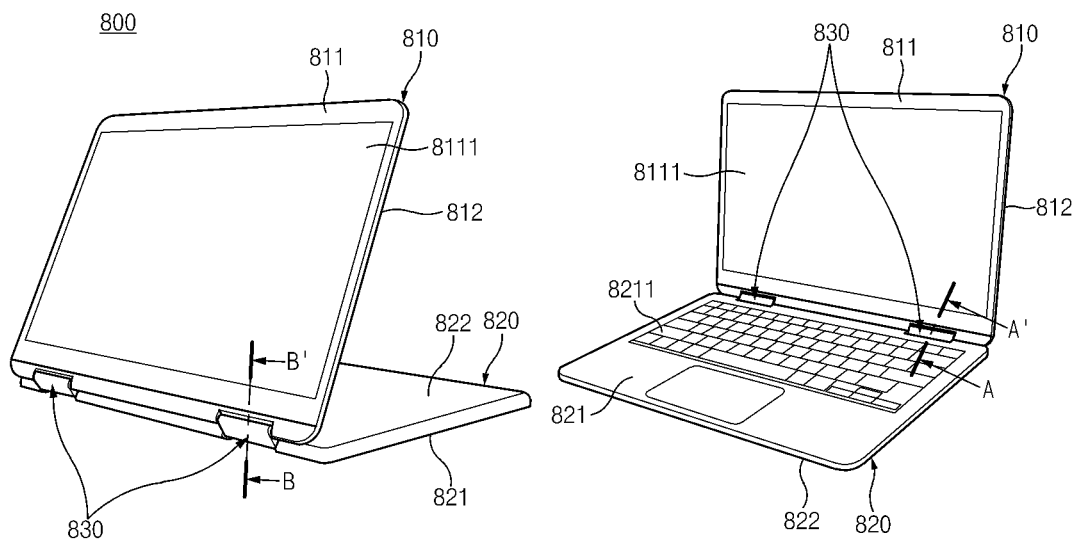
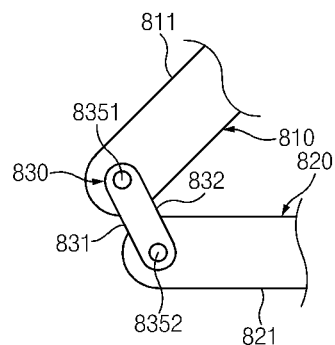
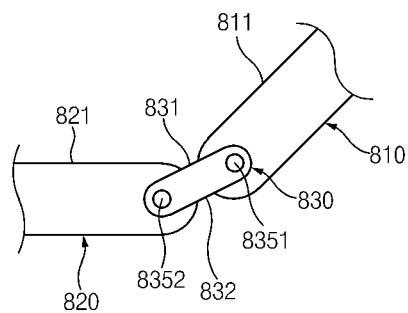
FIG.8A
FIG.8B

ELECTRONIC DEVICE INCLUDING HINGE HOUSING HAVING CONDUCTIVE PATTERN FORMED THEREON

CROSS-REFERENCE TO RELATED APPLICATION(S)

This application is based on and claims priority under 35 U.S.C. § 119 to Korean Patent Application No. 10-2018-0155308, filed on Dec. 5, 2018, in the Korean Intellectual Property Office, the disclosure of which is incorporated by reference herein its entirety.

BACKGROUND

1. Field

The disclosure relates to an electronic device including a hinge housing having a conductive pattern formed thereon.

2. Description of Related Art

With increasing competition between makers of mobile electronic devices, it has become important to provide mobile electronic devices that are both functional, as well as aesthetically pleasing.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprises a first housing, a second housing, a hinge housing disposed between the first housing and the second housing and containing a metallic material, a hinge structure, at least partially disposed in the hinge housing, wherein the hinge structure connects the first housing and the second housing to allow a selectable angle of rotation between the first housing and the second housing, and a conductive pattern formed on a surface of the hinge housing.

In accordance with another aspect of the disclosure, an electronic device comprises a first housing including a first surface on which a display area is formed and a second surface opposite the first surface, a second housing including a third surface on which an input device is formed and a fourth surface opposite the third surface, a hinge housing formed between the first housing and the second housing and having an interior space formed therein, and a bracket assembly configured to allow a selected angle of rotation about a first direction between the first housing and the second housing, at least part of the bracket assembly being disposed in the interior space of the hinge housing, wherein the hinge housing contains a metallic material and an insulating material, wherein a surface of the hinge housing includes a metal area formed by the metallic material and an insulating area formed by the insulating material, and wherein the metal area forms an antenna configured to radiate an electrical signal.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A and FIG. 8B are views illustrating various states of an electronic device and the positions of antennas in the various states according to an embodiment:

With regard to the description of the drawings, identical or similar reference numerals may be used to refer to identical or similar components.

DETAILED DESCRIPTION

Users typically find metallic materials more aesthetically pleasing. Accordingly, housings of mobile electronic devices can include metallic materials. The can be the case for a notebook computer (e.g., a laptop PC) as well as a smartphone. The notebook computer includes a plurality of antennas for supporting wireless communication. For example, the antennas may include a Bluetooth antenna and/or a Wi-Fi antenna. In general, the antennas of the notebook computer are arranged in an area (e.g., a bezel area) around a display area. The bezel area of the notebook computer is generally formed of a frame made of a non-metallic material.

Having an antenna disposed in a bezel area has two main drawback—the bezel area reduces the size of the display area, and use of many visually pleasing metallic materials causes interference with the antenna.

Certain embodiments of the disclosure may address at least the above-mentioned problems and/or disadvantages and to provide at least the advantages described below. Accordingly, an aspect of the disclosure may provide an electronic device including a metal housing and an antenna that is disposed on a hinge housing.

Another aspect of the disclosure may provide an electronic device including a metal housing, an antenna capable of maintaining radiation performance, and a thin bezel area that is formed of a metallic material.

Hereinafter, certain embodiments of the disclosure will be described with reference to the accompanying drawings. However, those of ordinary skill in the art will recognize that modification, equivalent, and/or alternative on the certain embodiments described herein can be variously made without departing from the scope and spirit of the disclosure.

Figure 1:
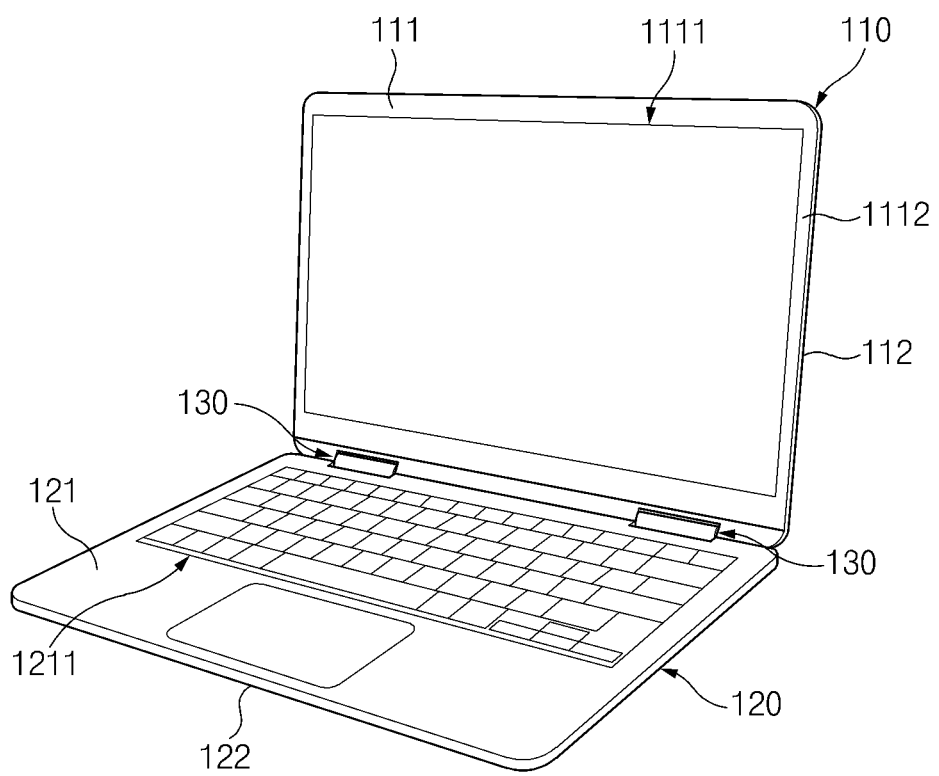
FIG. 1 is a view illustrating an electronic device according to an embodiment.

FIG. 1 is a view illustrating an electronic device 100 according to an embodiment.

The electronic device 100 according to an embodiment may include a first housing 110, a second housing 120, and hinge structures that allow a predetermined angle of rotation between the first housing 110 and the second housing 120. The hinge structures may each include a hinge housing 130 formed between the first housing 110 and the second housing 120.

In the illustrated embodiment, the first housing 110 may include a first surface 111 on which a display area 1111 is formed and a second surface 112 opposite the first surface 111. The portion of the first surface 111 which surrounds the display area is known as the bezel 1112. The second housing 120 may include a third surface 121 on which an input device 1211 is formed and a fourth surface 122 opposite the third surface 121. The input device 1211 may include a key input device and/or a touch input device. The second housing 120 may include a printed circuit board therein, on which one or more electric elements are mounted. The printed circuit board may include one or more communication modules.

In certain embodiments, the first housing 110 and the second housing 120 may rotate relative to each other about the hinge structures such that the first surface 111 of the first housing 110 and the third surface 121 of the second housing 120 form a predetermined angle therebetween. Hereinafter, the angle formed by the first housing 110 and the second housing 120 may refer to the angle formed by the normal vector perpendicular to the first surface 111 of the first housing 110 and the normal vector perpendicular to the third surface 121 of the second housing 120.

In certain embodiments, the first housing 110 and the second housing 120 may form an angle of 0 degrees to 360 degrees therebetween. For example, the first housing 110 and the second housing 120 of the electronic device 100 illustrated in FIG. 1 may form an angle of 0 degrees to 180 degrees therebetween, but are not necessarily limited thereto. For example, the electronic device 100 may include a state in which the first housing 110 and the second housing 120 form an angle of 180 degrees or more therebetween, the third surface 121 of the second housing 120 is supported on the ground, and the first surface 111 of the first housing 110 forms a predetermined angle with respect to the ground.

In certain embodiments, the first housing 110 and the second housing 120 may form an angle of 360 (the back of the housing 110) touches the back of housing 120, allowing the electronic device 100 to be used in a touchscreen only mode.

The electronic device 100 uses various antennas for radio communication, including Wi-Fi, BlueTooth, and Near Field Communication (NFC) to name a few. Placement of antenna(s) in the bezel 1112 increases the size of the bezel. 1112 thereby reducing the display area 1111. Additionally, when antennas are placed in the bezel 1112, it becomes difficult to use visually pleasing metallic materials, because the metallic materials can interfere with the performance of the antenna(s).

Accordingly, in certain embodiments, the antenna(s) can be disposed in the hinge structure 132.

Figure 2:
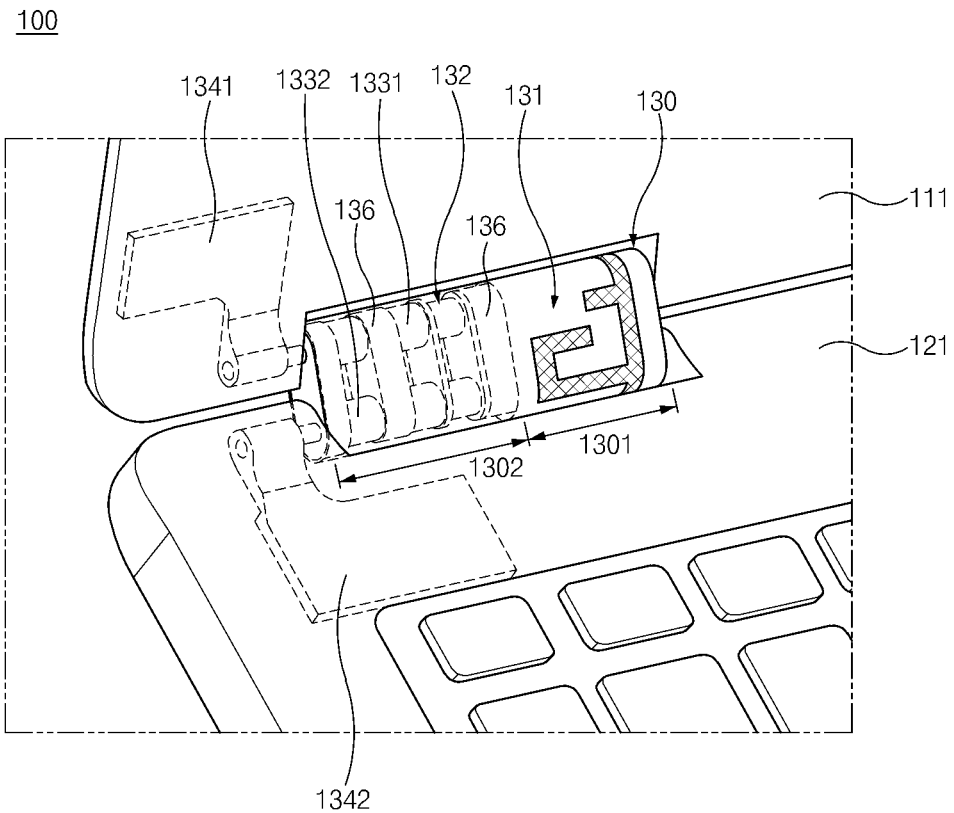
FIG. 2 is a view illustrates a hinge structure according to an embodiment.

FIG. 2 is a view illustrating a left hinge structure 132 according to an embodiment.

Referring to FIG. 2, the left hinge structure 132 may include the hinge housing 130, a bracket 136, rotary shafts 1331 and 1332, fixed parts 1341 and 1342, and a conductive pattern 131. Although FIG. 2 illustrates a left hinge structure 132, it should be noted that a right hinge structure is similar to the left hinge structure, except bracket 136, rotary shafts 1331 and 1332, fixed parts 1341 and 1342, and conductive pattern 131 are reversed from left to right.

The hinge housing 130 may have a cylindrical shape. At least one side of the hinge housing 130 may be open. For example, the hinge housing 130 may be open at opposite sides, or at one side, in a first direction in which the rotary shafts 1331 and 1332 extend. The bracket 136 may be disposed in the hinge housing 130. The hinge housing 130 may contain a metallic material and an insulating material. The metallic material, together with the insulating material, may form a surface of the hinge housing 130. In the illustrated embodiment, the hinge housing 130 may be mainly formed of the metallic material, and the insulating material may be formed around the conductive pattern 131.

In the illustrated embodiment, the left hinge structure 132 may include the conductive pattern 131 formed on a portion of the surface of the hinge housing 130. In certain embodiments, the hinge housing 130 may include a first part 1301 including the conductive pattern 131 and a second part 1302 in which the bracket 136 is disposed.

In certain embodiments, the hinge housing 130 may be formed in a cylindrical shape.

In the illustrated embodiment, at least part of the bracket 136 may be disposed in the hinge housing 130. The bracket 136 may be disposed in the second part 1302 of the hinge housing 130. The bracket 136 may include a plurality of plates having a shape substantially corresponding to the inner surface of the hinge housing 130. The plurality of plates may have openings formed therein, through which the rotary shafts 1331 and 1332 pass. The openings formed in the respective plates may be arranged along the extension direction of the rotary shafts 1331 and 1332. The plurality of plates may be formed to support rotation of the rotary shafts 1331 and 1332.

In certain embodiments, the bracket 136 may be formed of a metallic material. The bracket 136 may be formed in a shape corresponding to the hinge housing 130 to substantially make contact with the inner surface of the hinge housing 130.

In certain embodiments, an end portion of the bracket 136 that is oriented in the extension direction of the rotary shafts 1331 and 1332 may be exposed through the open one side of the hinge housing 130 to form a surface of the hinge housing 130.

In the illustrated embodiment, the rotary shafts 1331 and 1332 may extend outward from the interior of the hinge housing 130. The rotary shafts 1331 and 1332 may pass through the plurality of plates, which are included in the bracket 136, in the hinge housing 130. The rotary shafts 1331 and 1332 may pass through the plurality of plates and may extend outside the hinge housing 130. The rotation of the rotary shafts 1331 and 1332 may be supported by the plurality of plates. The rotary shafts 1331 and 1332 may be coupled with the first fixed part 1341 and the second fixed part 1342, respectively. The first fixed part 1341 may extend into the first housing 110 and may be fixed to the interior of the first housing 110, and the second fixed part 1342 may extend into the second housing 120 and may be fixed to the interior of the second housing 120.

In certain embodiments, the rotary shafts 1331 and 1332 may include the first rotary shaft 1331 to which the first fixed part 1341 is coupled so as to be rotatable and the second rotary shaft 1332 to which the second fixed part 1342 is coupled so as to be rotatable. When the first rotary shaft 1331 and the second rotary shaft 1332 are rotated, the first housing 110 and the second housing 120 may form a predetermined angle therebetween.

In the illustrated embodiment, the first fixed part 1341 may be rotated together with the first rotary shaft 1331, or may be coupled to the first rotary shaft 1331 so as to rotatable. The first fixed part 1341 may include a first fixed plate extending in the radial direction of the first rotary shaft 1331. The first fixed plate may extend into the first housing 110 and may be fixed to the interior of the first housing 110.

In the illustrated embodiment, the second fixed part 1342 may be rotated together with the second rotary shaft 1332, or may be coupled to the second rotary shaft 1332 so as to rotatable. The second fixed part 1342 may include a second fixed plate extending in the radial direction of the second rotary shaft 1332. The second fixed plate may extend into the second housing 120 and may be fixed to the interior of the second housing 120.

In the illustrated embodiment, the conductive pattern 131 may be formed on the surface of the hinge housing 130. The conductive pattern 131 may be formed by the metallic material formed in a specified pattern shape and the insulating material formed between the specified patterns.

In certain embodiments, the conductive pattern 131 may form an antenna. Where the conductive pattern 131 forms an antenna, the bezel 1112 may be reduced, thereby increasing the display area 1111. Additionally, the bezel 1112 can be made of metallic materials.

Figure 3A:
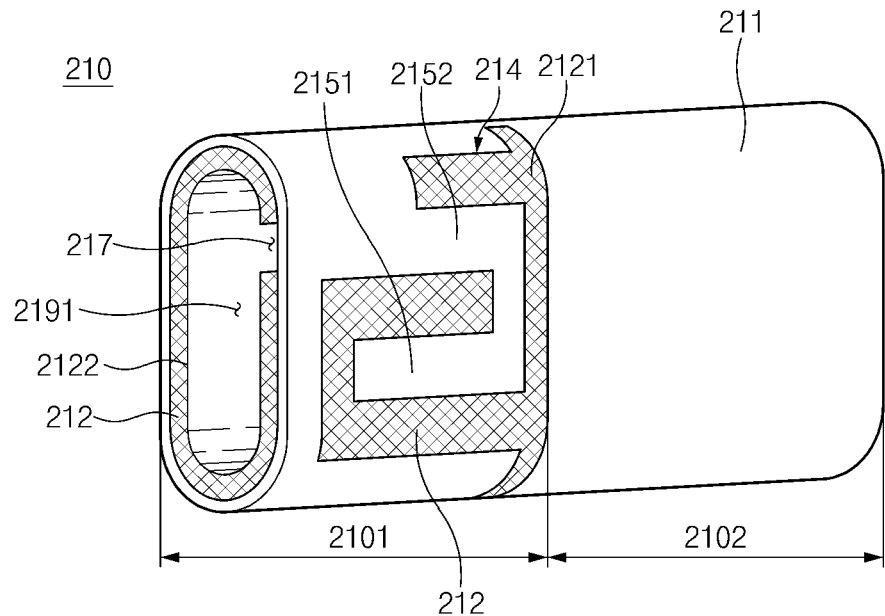
FIG. 3A and FIG. 3B are views illustrating a hinge housing of the electronic device and a conductive pattern formed on the hinge housing according to an embodiment.
Figure 3B:
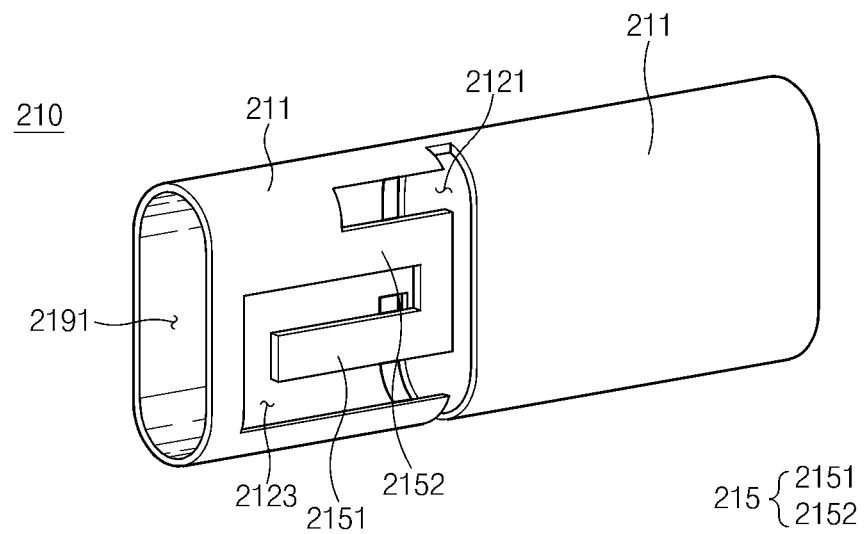

FIG. 3A and FIG. 3B are views illustrating a right hinge housing 210 of the electronic device 100 and a conductive pattern 215 formed on the hinge housing 210 according to an embodiment.

Referring to FIG. 3A, the hinge housing 210 may include a metal part 211 formed of a metallic material and an insulating part 212 formed of an insulating material. The hinge housing 210 may include a first part 2101 including a pattern area 214 and a second part 2102 extending from the first part 2101. Although FIG. 3 illustrates a right hinge housing 210, it should be noted that a left hinge housing is similar to the right hinge housing, except the insulating part 212 and metal part 211 are reversed.

The pattern area 214 may include the conductive pattern 215 formed on a surface of the hinge housing 210. The pattern area 214 may include metal areas 2151 and 2152 that are formed in a specified shape and that are formed on the surface of the hinge housing 210 by the metal part 211, and an insulating area 2121 that is formed between the metal areas 2151 and 2152 and that is formed on the surface of the hinge housing 210 by the insulating part 212. The metal areas 2151 and 2152 may correspond to the conductive pattern 215 that forms an antenna. The specified shape of the metal areas 2151 and 2152 may form radiation characteristics of the antenna.

In certain embodiments, a portion of the insulating material may form an insulating layer 2122 on the inner surface of the hinge housing 210. The remaining portion of the insulating material may form the insulating area 2121 between the metal areas 2151 and 2152, and the insulating area 212 may form the surface of the hinge housing 210 together with the metallic material (e.g., the metal areas 2151 and 2152).

In certain embodiments, the insulating area 2121 may be formed in the first part 2101 of the hinge housing 210. In some embodiments, the insulating layer 2122 formed by the insulating part 212 may be formed in the first part 2101 and the second part 2102 of the hinge housing 210.

Referring to FIG. 3B, the conductive pattern 215 may be formed by forming a slit 2123 on the surface of the hinge housing 210 formed of the metallic material and injecting the insulating material into the slit 2123. The insulating material injected into the slit 2123 may form the insulating area 2121 on a portion of the surface of the hinge housing 210.

In certain embodiments, the conductive pattern 215 may be defined by forming the metal areas 2151 and 2152 having a predetermined electrical path by the insulating area 2121. In certain embodiments, the conductive pattern 215 may form an antenna.

Figure 4:
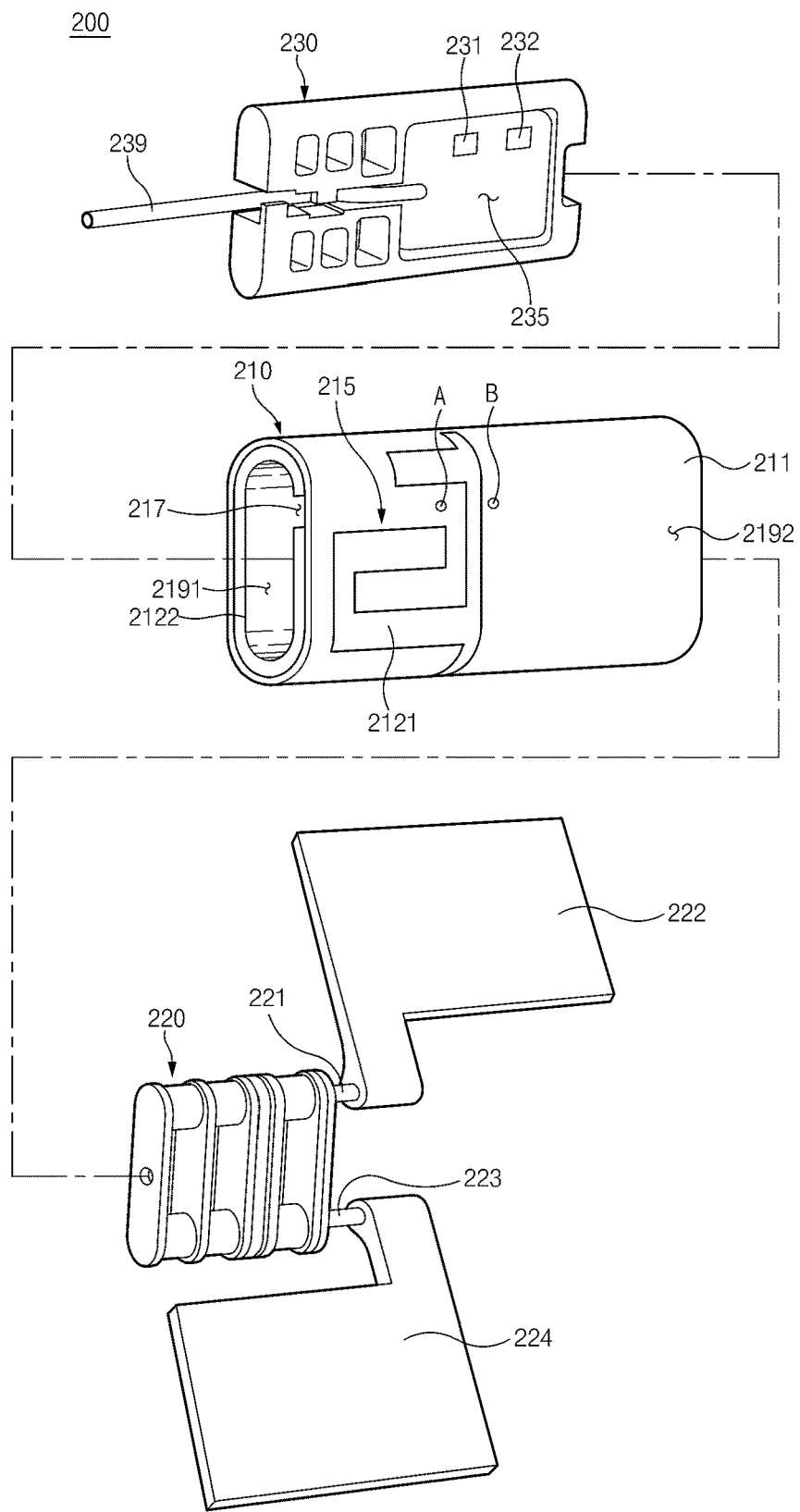
FIG. 4 is a view illustrating the interior of a hinge structure of the electronic device according to an embodiment.

FIG. 4 is a view illustrating the interior of a hinge structure of the electronic device 100 according to an embodiment.

In certain embodiments, the conductive pattern 215 may include a first area "A" and a second area "B". For example, the first area "A" may be a feeding area to which a feeding signal for supplying power to the conductive pattern 215 is applied, and the second area "B" may be a ground area to which the feeding signal flows via the conductive pattern 215. It is again noted that the hinge structure can either be connected on the left or right of housings 110 and 120 (left and right, based on the orientation of the user when viewing the display area 1111, while using the keyboard). In certain embodiments, the hinge structures can be reversed from left to right, and vice versa.

In certain embodiments, an electrical path formed from the first area "A" to the second area "B" via at least part of the conductive pattern 215 may have predetermined antenna characteristics.

In certain embodiments, the second part 2102 of the hinge housing 210 may substantially form the ground area.

In the illustrated embodiment, a mold member 230 may be formed of an insulating material. The mold member 230 may have a shape substantially corresponding to the space in the hinge housing 210. The mold member 230 may be formed such that the outer surface of the mold member 230 makes contact with the inner surface of the hinge housing 210.

In the illustrated embodiment, a substrate 234 may be disposed on the mold member 230. The substrate 234 may include one or more conductive areas 231 and 232. A recess 235 in which the substrate 234 is disposed may be formed on the mold member 230. In certain embodiments, at least part of the recess 235 may be formed in an area corresponding to the pattern area 214 of the hinge housing 210 (e.g., in the first part 2101 of the hinge housing 210 of FIG. 3).

In certain embodiments, the conductive areas 231 and 232 may include the first conductive area 231 electrically connected with the first area "A" of the conductive pattern 215 and the second conductive area 232 electrically connected with the second area "'B'" of the conductive pattern 215. The conductive areas 231 and 232 and the conductive pattern 215 may include various connection methods.

In certain embodiments, the electronic device 100 may further include a cable 239 that is electrically connected with the first conductive area 231 and the second conductive area 232 in the hinge housing 210 and that extends from the interior of the hinge housing 210 to the interior of a second housing (e.g., the second housing 120 of FIG. 2). The cable 239 may be electrically connected with a communication module included in the second housing (e.g., the second housing 120 of FIG. 2).

In the illustrated embodiment, a bracket 220 may be disposed on one side of the mold member 230 in the extension direction of rotary shafts 221 and 223. The rotary shafts 221 and 223 are attached to flaps 222, 224. The flaps 222, 224 are inserted into the first housing 110 and second housing and configured to provide pressing force.

In the illustrated embodiment, the hinge housing 210 may be open at opposite sides in the extension direction of the rotary shafts 221 and 223. The mold member 230 may be inserted into the hinge housing 210 through one side 2191 of the hinge housing 210, and the bracket 220 may be inserted into the hinge housing 210 through an opposite side of the hinge housing 210.

In certain embodiments, the hinge housing 210 may include a groove 217 formed on the inner surface thereof. The groove 217 may extend from the open one side 2191 of the hinge housing 210 to the first area "A" and/or the second area "B".

For example, the first conductive area 231 may include a terminal that protrudes from the mold member 230 to the inner surface of the hinge housing 210 to make contact with the first area "A" of the conductive pattern 215. For example, the second conductive area 232 may include a terminal that protrudes from the mold member 230 to the inner surface of the hinge housing 210 to make contact with the second area "B" of the conductive pattern 215.

When the mold member 230 is inserted into the hinge housing 210 through the open one side 2191 of the hinge housing 210, the terminals protruding from the mold member 230 may be inserted to the first area "A" and/or the second area "B" along the groove 217.

In certain embodiments, the groove 217 may be an area where the insulating layer 2122 formed on the inner surface of the hinge housing 210 is not formed.

Figure 5:
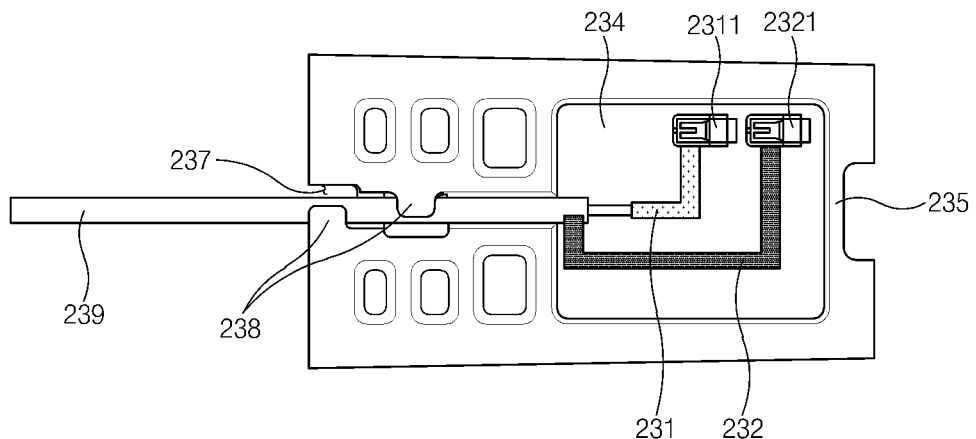
FIG. 5 is a view illustrating a mold member of the electronic device according to an embodiment.
Figure 5:
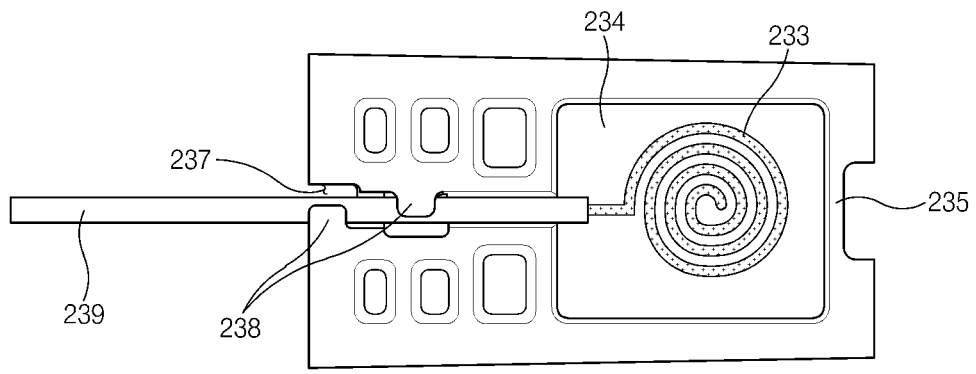

FIG. 5 is a view illustrating the mold member 230 of the electronic device 100 according to an embodiment.

In the illustrated embodiment, the substrate 234 may include a first terminal 2311 and a second terminal 2321. The first terminal 2311 may protrude from the substrate 234 to make contact with the first area "A" of the hinge housing 210. In some embodiments, a feeding signal for supplying power to the conductive pattern 215 may be applied to the first terminal 2311. The second terminal 2321 may protrude from the substrate 234 to make contact with the second area "B" of the hinge housing 210. In some embodiments, the second terminal 2321 may be a ground area to which the feeding signal flows from the first terminal 2311 via the conductive pattern 215.

Referring to (a) of FIG. 5, the cable 239 may include a coaxial cable 239. The mold member 230 may have a groove 237 formed therein, in which the coaxial cable 239 is disposed. In some embodiments, the groove 237 may extend from an end surface of the mold member 230 to the recess 235 in which the substrate 234 is disposed. The coaxial cable 239 may extend from outside the hinge housing 210 to the substrate 234, which is disposed in the hinge housing 210, along the groove 237. A fixing structure 238 for fixing the coaxial cable 239 may be formed around the groove 237.

In certain embodiments, the cable 239 may include a first conductive wire material, a second conductive wire material surrounding the first conductive wire material, and an insulating member formed between the first conductive wire material and the second conductive wire material.

In certain embodiments, the first conductive wire material may be electrically connected with the first terminal 2311, and the second conductive wire material may be electrically connected with the second terminal 2321. The first conductive wire material and the first terminal 2311 may be electrically connected by the first conductive area 231 formed on the substrate 234. The second conductive wire material and the second terminal 2321 may be electrically connected by the second conductive area 232 formed on the substrate 234. The first conductive area 231 and the second conductive area 232 may each include a pattern printed on the substrate 234.

In some embodiments, the cable 239 may be configured such that a feeding signal is applied to the first conductive wire material and a ground signal is applied to the second conductive wire material.

In some embodiments, the mold member 230 may include only one conductive area (e.g., the first conductive area 231) that is electrically connected to the cable 239. A feeding signal for supplying power to the conductive pattern 215 may be applied to the one conductive area. The one conductive area (e.g., the first conductive area 231) may include a protruding terminal (e.g., the first terminal 2311) that is brought into contact with the conductive pattern 215. The cable 239 may include one core (e.g., the first conductive wire material) that transmits the feeding signal. The conductive pattern 215 may be grounded to the remaining part of the hinge housing 210 (e.g., the second part 2102 of FIG. 3) or the bracket 220.

Referring to (b) of FIG. 5, the substrate 234 may include a conductive pattern 233 that is formed in a specified shape and that is formed to electromagnetically interact with a conductive pattern (e.g., the conductive pattern 215 of FIG. 4) (hereinafter, referred to as the antenna pattern) that is formed on a surface of a hinge housing (e.g., the hinge housing 210 of FIG. 4). The conductive pattern 233 may be printed on the substrate 234. The conductive pattern 233 may face the antenna pattern (e.g., the conductive pattern 215 of FIG. 4) that is formed on the surface of the hinge housing (e.g., the hinge housing 210 of FIG. 4), but may be physically spaced apart from the antenna pattern.

In certain embodiments, the conductive pattern 233 may be configured to be electromagnetically coupled with the antenna pattern (e.g., the conductive pattern 215 of FIG. 4) and may therefore supply power to the antenna pattern.

For example, when power is supplied to the conductive pattern 233 through the cable 239, a magnetic field may be generated, and the antenna pattern may be supplied with power while the magnetic field is induced on the antenna pattern (e.g., the conductive pattern 215 of FIG. 4).

In another example, the conductive pattern 233 and the antenna pattern (e.g., the conductive pattern 215 of FIG. 4) may be formed to have the same resonant frequency. In this case, when power is supplied to the conductive pattern 233 through the cable 239, a magnetic field oscillating at the resonant frequency may be generated, and therefore the antenna pattern (e.g., the conductive pattern 215 of FIG. 4), which is configured to have the same resonant frequency, may be supplied with power.

In (b) of FIG. 5, the conductive pattern 233 is illustrated as a spiral pattern. Without being necessarily limited thereto, however, the conductive pattern 233 may include patterns in various shapes that are capable of being electromagnetically coupled with the conductive pattern formed on the surface of the hinge housing.

Figure 6A:
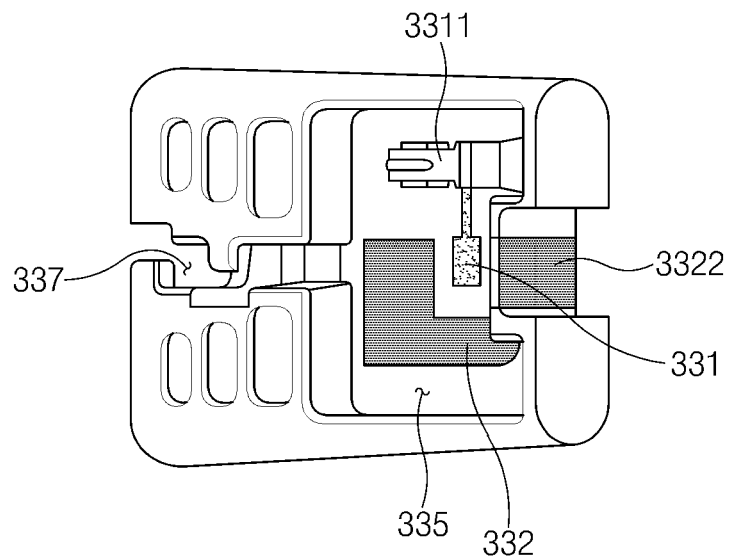
FIG. 6A and FIG. 6B are views illustrating a mold member of the electronic device according to certain embodiments.
Figure 6B:
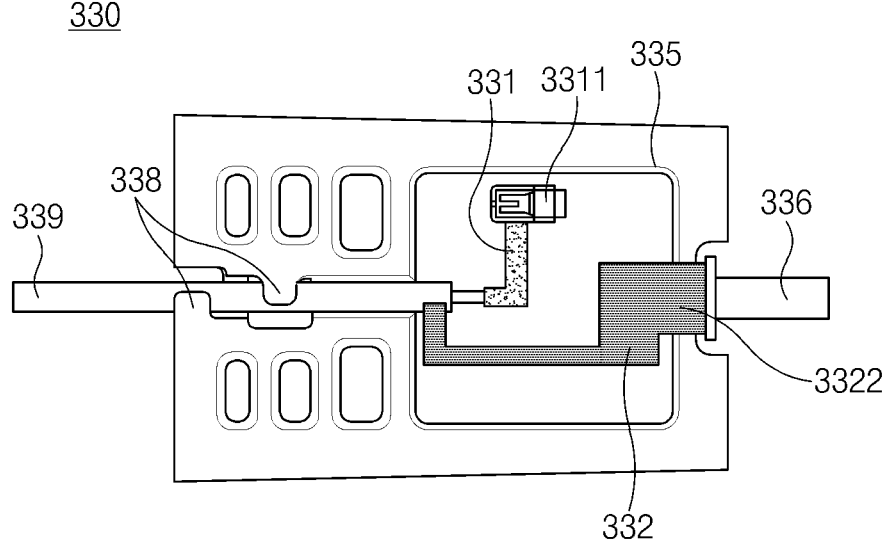

FIG. 6A and FIG. 6B are views illustrating a mold member 330 of the electronic device 100X) according to certain embodiments.

In certain embodiments, the mold member 330 (e.g., the mold member 230 of FIG. 4) may be formed in a shape substantially corresponding to the interior space of a hinge housing (e.g., the hinge housing 210 of FIG. 4). The mold member 330 may be formed of an insulating material and may therefore be electrically insulated from the hinge housing (e.g., the hinge housing 210 of FIG. 4) that contains a metallic material.

In certain embodiments, the mold member 330 may include a first conductive area 331 and a second conductive area 332 on a surface of the mold member 330 that faces the inner surface of the hinge housing (e.g., the hinge housing 210 of FIG. 4). At least part of each of the first conductive area 331 and the second conductive area 332 may be formed in an area corresponding to a conductive pattern (e.g., the conductive pattern 215 of FIG. 4).

In certain embodiments, the mold member 330 may include a recess 335, at least part of which is formed in the area corresponding to the conductive pattern (e.g., the conductive pattern 215 of FIG. 4). The first conductive area 331 and the second conductive area 332 may be formed in the recess 335. The first conductive area 331 and the second conductive area 332 may each include a conductive pattern printed on the recess 335 of the mold member 330.

In the illustrated embodiment, the first conductive area 331 may include a protruding terminal 3311 that is brought into contact with the conductive pattern (e.g., the conductive pattern 215 of FIG. 4). The protruding terminal 3311 may include a C-clip. A feeding signal for supplying power to the conductive pattern (e.g., the conductive pattern 215 of FIG. 4) may be applied to the first conductive area 331. The terminal 3311 may protrude to press the inner surface of the hinge housing (e.g., the hinge housing 210 of FIG. 4). The area pressed by the terminal 3311 may correspond to a feeding area of the conductive pattern 215 (e.g., the first area "A" of the hinge housing 210 of FIG. 4).

In the illustrated embodiment, the mold member 330 may include a contact surface 3322 that faces a bracket (e.g., the bracket 220 of FIG. 4). The second conductive area 332 may be formed as a ground area to which the conductive pattern (e.g., the conductive pattern 215 of FIG. 4) is grounded. At least part of the second conductive area 332 may extend to the bracket (e.g., the bracket 220 of FIG. 4) and the contact surface 3322 of the mold member 330. The contact surface 3322 may be brought into contact with the bracket formed of a metallic material (e.g., the bracket 220 of FIG. 4) to make an electrical connection with the bracket, or may be brought into contact with the bracket (e.g., the bracket 220 of FIG. 4) through a conductive fastening member 336. Accordingly, the bracket (e.g., the bracket 220 of FIG. 4) may be formed as a ground area of the conductive pattern (e.g., the conductive pattern 215 of FIG. 4).

In the illustrated embodiment, the electronic device 100 may include a cable 339 electrically connected with the first conductive area 331. Referring to FIG. 6A, unlike in the embodiment illustrated in FIG. 5, the cable 339 may not be connected with the second conductive area 332. For example, the second conductive area 332 may be electrically connected with the bracket (e.g., the bracket 220 of FIG. 4).

In certain embodiments such as FIG. 6B, the mold member 330 may have a groove 337 formed therein, in which the cable 339 is disposed. The groove 337 may extend from an end surface of the mold member 330 to the recess 335 in which the substrate 334 is disposed. A fixing structure 338 for fixing the coaxial cable 339 may be formed around the groove 337.

Figure 7:
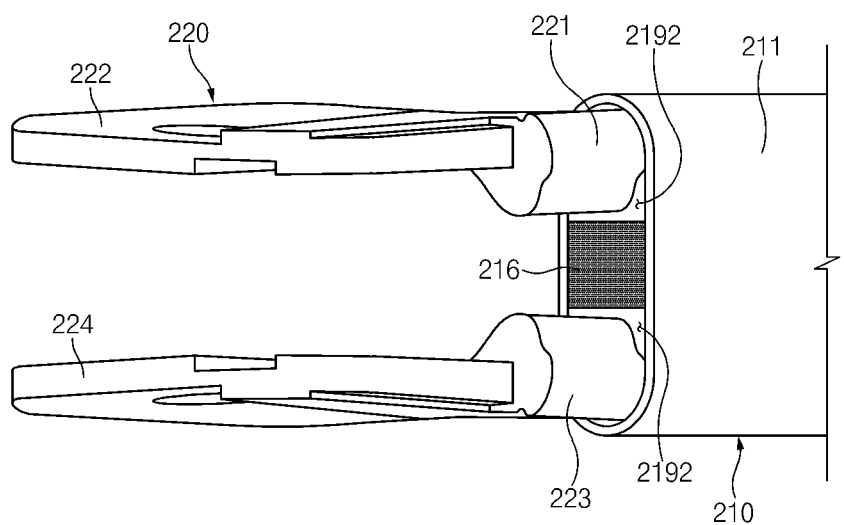
FIG. 7 is a view illustrating a bracket and the hinge housing of the electronic device according to certain embodiments.

FIG. 7 is a view illustrating the bracket 220 and the hinge housing 210 of the electronic device 100 according to certain embodiments.

As described above, the bracket 220 formed of a metallic material may be formed as a ground area of a conductive pattern (e.g., the conductive pattern 215 of FIG. 4). Furthermore, the hinge housing 210 may include the metal part 211, and an insulating layer (e.g., the insulating layer 2122 of FIG. 4) may be formed on the inner surface of the hinge housing 210. For example, the insulating layer (e.g., the insulating layer 2122 of FIG. 4) may be formed between the bracket 220 and the hinge housing 210.

Referring to FIG. 7, the hinge housing 210 may be open at an opposite side 2192, and the bracket 220 may be inserted into the hinge housing 210 through the open opposite side 2192. An end portion of the bracket 220 may form a portion of the surface of the hinge housing 210. In certain embodiments, the bracket 220 may include a connecting surface 216 extending from the end portion thereof to the hinge housing 210. The connecting surface 216 may be formed of a metallic material, and the bracket 220 and the hinge housing 210 may be electrically connected.

Rotary shafts 221 and 223 can protrude through an opening in side 2192, controlling flaps 222, 224. The flaps 222 and 224 are inserted into first housing, and second housing 120. In certain embodiments, rotary shafts 221 and 223 have rotational resistance sufficient to withstand the force of the moment arm of the housing 210 and 220, but not exceeding the amount of force that a human can apply.

Accordingly, referring to FIGS. 6A, 6B and 7, the bracket 220, together with the hinge housing 210, may be formed as a ground area of the conductive pattern (e.g., the conductive pattern 215 of FIG. 4).

FIG. 8A and FIG. 8B are views illustrating various states of an electronic device 800 and the positions of antennas 831 and 832 in the various states according to an embodiment.

In an embodiment, the electronic device 800 may include a first housing 810, a second housing 820, and hinge structures that connect the first housing 810 and the second housing 820 to allow rotation between the first housing 810 and the second housing 820. The hinge structures may include hinge housings 830 formed between the first housing 810 and the second housing 820. The hinge structures may each include one or more rotary shafts 8351 and 8352 that are disposed in the hinge housing 830 and to which the first housing 810 and the second housing 820 are coupled for a predetermined angle of rotation therebetween.

In the illustrated embodiment, the first housing 810 may include a first surface 811 on which a display area 811 is formed and a second surface 812 opposite the first surface 811. The second housing 820 may include a third surface 821 on which an input device 8211 is formed and a fourth surface 822 opposite the third surface 821.

In certain embodiments, the electronic device 800 may include a first state (FIG. 8A) in which the first surface 811 of the first housing 810 and the third surface 821 of the second housing 820 form an angle of 0 degrees to 360 degrees therebetween and a second state (FIG. 8B) in which the first surface 811 of the first housing 810 and the third surface 821 of the second housing 820 form an angle of 0 degrees to 180 degrees therebetween.

In the illustrated embodiment, in the first state (FIG. 8A), the electronic device 800 may be configured such that the third surface 821 of the second housing 820 is disposed on the ground and the first housing 810 is inclined at a predetermined angle with respect to the third surface 821 of the second housing 820.

In the illustrated embodiment, in the second state (FIG. 8B), the electronic device 800 may be configured such that the fourth surface 822 of the second housing 820 is disposed on the ground and the first housing 810 is inclined at a predetermined angle with respect to the fourth surface 822 of the second housing 820.

In certain embodiments, the first state (FIG. 8A) may include a tablet mode. The second state (FIG. 8B) may include a laptop mode.

In the illustrated embodiment, the hinge housing 830 may include a first surface formed between the first surface 811 of the first housing 810 and the third surface 821 of the second housing 820 and a second surface formed between the second surface 812 of the first housing 810 and the fourth surface 822 of the second housing 820.

In the illustrated embodiment, the electronic device 800 may include the first antenna 831 formed on the first surface of the hinge housing 830 and the second antenna 832 formed on the second surface of the hinge housing 830. In certain embodiments, the first antenna 831 and the second antenna 832 may be integrally formed with each other. For example, the first antenna 831 may be formed on the first surface and may extend to the second surface.

In certain embodiments, one of the first antenna 831 and the second antenna 832 may have various radiation ranges depending on the states of the electronic device 800. The first antenna 831 may have a first radiation range corresponding to the angle formed by the first surface 811 of the first housing 810 and the third surface 821 of the second housing 820. The second antenna 832 may have a second radiation range corresponding to the angle formed by the second surface 812 of the first housing 810 and the fourth surface 822 of the second housing 820.

For example, when the electronic device 800 is in the first state (FIG. 8A), the first antenna 831 may have the first radiation range of 180 degrees to 360 degrees that is formed by the first surface 811 of the first housing 810 and the third surface 821 of the second housing 820. Meanwhile, the second antenna 832 may have the second radiation range of 0 degrees to 180 degrees that is formed by the second surface 812 of the first housing 810 and the fourth surface 822 of the second housing 820. In certain embodiments, when the electronic device 800 is in the first state (FIG. 8A), the first antenna 831 may have a wider radiation range than the second antenna 832 and may therefore provide stable wireless communication.

For example, when the electronic device 800 is in the second state (FIG. 8B), the first antenna 831 may have the first radiation range of 0 degrees to 180 degrees that is formed by the first surface 811 of the first housing 810 and the third surface 821 of the second housing 820. Meanwhile, the second antenna 832 may have the second radiation range of 180 degrees to 360 degrees that is formed by the second surface 812 of the first housing 810 and the fourth surface 822 of the second housing 820. In certain embodiments, when the electronic device 800 is in the second state (FIG. 8B), the second antenna 832 may have a wider radiation range than the first antenna 831 and may therefore provide stable wireless communication.

In certain embodiments, a communication module may be configured to operate the first antenna 831 having a relatively wide radiation range as a main radiation antenna when the electronic device 800 is in the first state (FIG. 8A) and to operate the second antenna 832 having a relatively wide radiation range as a main radiation antenna when the electronic device 800 is in the second state (FIG. 8B).

The electronic device 800 according to certain embodiments may include an antenna that provides stable wireless communication performance irrespective of the angle formed by the first housing 810 and the second housing 820.

Furthermore, the first housing 810, the second housing 820, and the hinge housings 830 that form the exterior of the electronic device 800 are entirely formed of metallic materials, and thus the electronic device 800 according to certain embodiments may provide an aesthetic sense of unity to a user.

In addition, the electronic device 800 according to certain embodiments includes the hinge housings 830 including the antennas, thereby reducing the size of a bezel unlike an electronic device in the related art and thus providing the relatively wide display area 8111 to the user.

Figure 9:
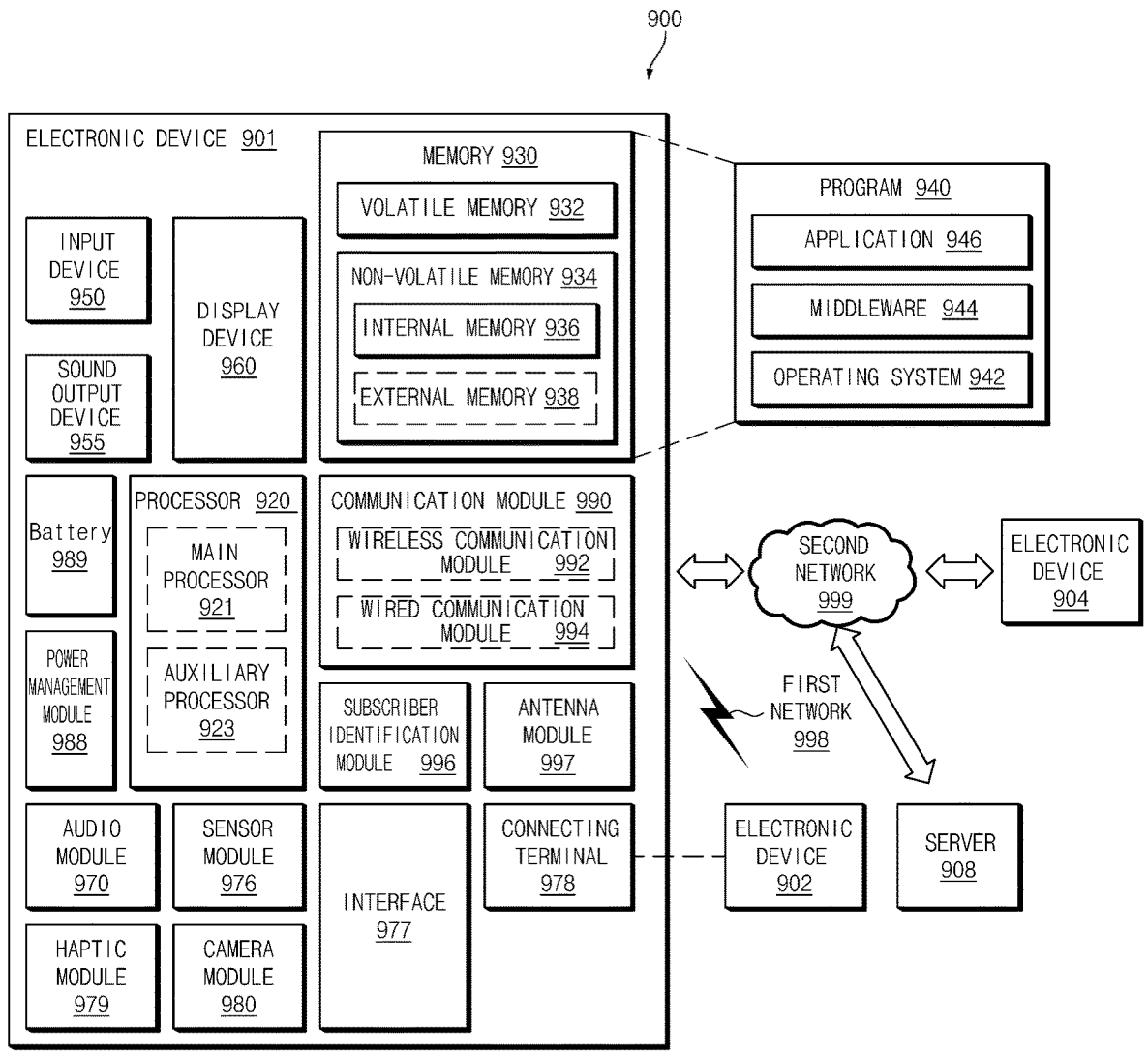
FIG. 9 is a block diagram illustrating an electronic device in a network environment according to certain embodiments.

FIG. 9 is a block diagram illustrating an electronic device 901 in a network environment 900 according to certain embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Figure 10:
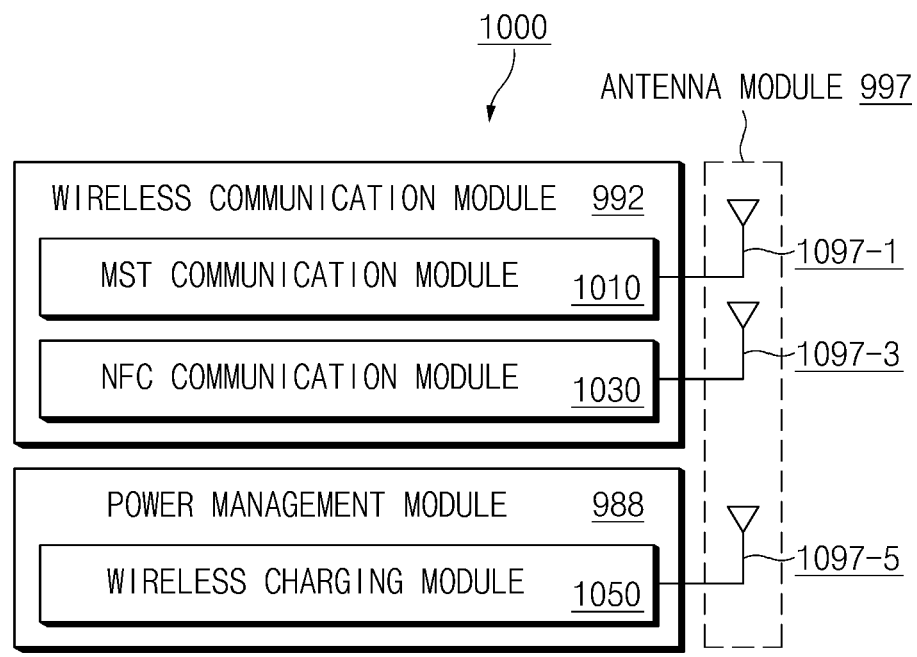
FIG. 10 is a block diagram illustrating a wireless communication module, a power management module, and an antenna module of the electronic device according to certain embodiments.

FIG. 10 is a block diagram 1000 illustrating the wireless communication module 992, the power management module 988, and the antenna module 997 of the electronic device 901 according to certain embodiments. Referring to FIG. 10, the wireless communication module 992 may include a magnetic secure transmission (MST) communication module 1010 or a near-field communication (NFC) module 1030, and the power management module 988 may include a wireless charging module 1050. In such a case, the antenna module 997 may include a plurality of antennas that include a MST antenna 1097-1 connected with the MST communication module 1010, a NFC antenna 1097-3 connected with the NFC communication module 1030, and a wireless charging antenna 1097-5 connected with the wireless charging module 1050. For ease of description, the same components as those described in regard to FIG. 9 are briefly described or omitted from the description.

The MST communication module 1010 may receive a signal containing control information or payment information such as card information from the processor 920, generate a magnetic signal corresponding to the received signal, and then transfer the generated magnetic signal to the external electronic device 902 (e.g., a point-of-sale (POS) device) via the MST antenna 1097-1. To generate the magnetic signal, according to an embodiment, the MST communication module 1010 may include a switching module (not shown) that includes one or more switches connected with the MST antenna 1097-1, and control the switching module to change the direction of voltage or current supplied to the MST antenna 1097-1 according to the received signal. The change of the direction of the voltage or current allows the direction of the magnetic signal (e.g., a magnetic field) emitted from the MST antenna 1097-1 to change accordingly. If detected at the external electronic device 902, the magnetic signal with its direction changing may cause an effect (e.g., a waveform) similar to that of a magnetic field that is generated when a magnetic card corresponding to the card information associated with the received signal is swiped through a card reader of the electronic device 902. According to an embodiment, for example, payment-related information and a control signal that are received by the electronic device 902 in the form of the magnetic signal may be further transmitted to an external server 908 (e.g., a payment server) via the network 999.

The NFC communication module 1030 may obtain a signal containing control information or payment information such as card information from the processor 920 and transmit the obtained signal to the external electronic device 902 via the NFC antenna 1097-3. According to an embodiment, the NFC communication module 1030 may receive such a signal transmitted from the external electronic device 902 via the NFC antenna 1097-3.

The wireless charging module 1050 may wirelessly transmit power to the external electronic device 902 (e.g., a cellular phone or wearable device) via the wireless charging antenna 1097-5, or wirelessly receive power from the external electronic device 902 (e.g., a wireless charging device). The wireless charging module 1050 may support one or more of various wireless charging schemes including, for example, a magnetic resonance scheme or a magnetic induction scheme.

According to an embodiment, some of the MST antenna 1097-1, the NFC antenna 1097-3, or the wireless charging antenna 1097-5 may share at least part of their radiators. For example, the radiator of the MST antenna 1097-1 may be used as the radiator of the NFC antenna 1097-3 or the wireless charging antenna 1097-5, or vice versa. In such a case, the antenna module 997 may include a switching circuit (not shown) adapted to selectively connect (e.g., close) or disconnect (e.g. open) at least part of the antennas 1097-1, 1097-3, or 1097-5, for example, under the control of the wireless communication module 992 (e.g., the MST communication module 1010 or the NFC communication module 1030) or the power management module (e.g., the wireless charging module 1050). For example, when the electronic device 901 uses a wireless charging function, the NFC communication module 1030 or the wireless charging module 1050 may control the switching circuit to temporarily disconnect at least one portion of the radiators shared by the NFC antenna 1097-3 and the wireless charging antenna 1097-5 from the NFC antenna 1097-3 and to connect the at least one portion of the radiators with the wireless charging antenna 1097-5.

According to an embodiment, at least one function of the MST communication module 1010, the NFC communication module 1030, or the wireless charging module 1050 may be controlled by an external processor (e.g., the processor 920). According to an embodiment, at least one specified function (e.g., a payment function) of the MST communication module 1010 or the NFC communication module 1030 may be performed in a trusted execution environment (TEE). According to an embodiment, the TEE may form an execution environment in which, for example, at least some designated area of the memory 930 is allocated to be used for performing a function (e.g., a financial transaction or personal information-related function) that requires a relatively high level of security. In such a case, access to the at least some designated area of the memory 930 may be restrictively permitted, for example, according to an entity accessing thereto or an application being executed in the TEE.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C." may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore®), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the electronic device may include a metal housing and an antenna and may maintain the radiation performance of the antenna. Furthermore, the electronic device may provide a thin bezel area, thereby achieving a relatively wide display area.

In addition, the disclosure may provide various effects that are directly or indirectly recognized.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing;
   a hollow hinge housing disposed between the first housing and the second housing and containing a metal material;
   a hinge structure, at least partially disposed in the hollow hinge housing, wherein the hinge structure connects the first housing and the second housing to allow a selectable angle of rotation between the first housing and the second housing;
   a conductive pattern formed by the metal material comprising a slit on an outer surface of the hollow hinge housing;
   a mold member disposed in the hollow hinge housing; and
   a terminal disposed on the mold member,
   wherein an insulating material is disposed in the slit forming an insulating area, the insulating area and the metal material together forming the outer surface of the hollow hinge housing,
   wherein a portion of the insulating material forms an insulating layer on an inner surface of the hollow hinge housing,
   wherein the insulating layer includes a groove through which part of the metal material is exposed, and
   wherein the terminal protrudes through the groove to fixably contact the conductive pattern.

2. The electronic device of claim 1, the conductive pattern comprises a first metal area and a second metal area, wherein the insulating material is disposed between the first metal area and the second metal area.

3. The electronic device of claim 1, wherein the hinge structure includes a bracket disposed in the hollow hinge housing,
   wherein a conductive area on which the terminal is disposed on the mold member and electrically connected with the conductive pattern via the terminal.

4. The electronic device of claim 3, wherein the conductive area includes a plurality of conductive areas,
   wherein a feeding signal from either the first housing or the second housing is received by some of the plurality of conductive areas, and
   wherein a ground area is formed on other conductive areas.

5. The electronic device of claim 3, further comprising:
   a communication module disposed in the second housing; and
   a cable extending into the second housing from the conductive area to electrically connect the conductive area and the communication module,
   wherein the conductive pattern forms an antenna.

6. The electronic device of claim 3, wherein the hinge structure includes:
   a rotary shaft extending outside the hollow hinge housing from the bracket;
   a first flap coupled to the rotary shaft so as to be rotatable, the first flap being fixed to an interior of the first housing; and
   a second flap coupled to the rotary shaft so as to be rotatable, the second flap being fixed to the interior of the second housing.

7. The electronic device of claim 3, wherein the bracket is formed of metallic material,
   wherein the conductive area includes a plurality of conductive areas insulated from each other, and
   wherein some of the plurality of conductive areas are electrically grounded to the bracket.

8. An electronic device comprising:
   a first housing;
   a second housing;
   a hinge housing disposed between the first housing and the second housing and containing a metallic material;
   a hinge structure, at least partially disposed in the hinge housing, wherein the hinge structure connects the first housing and the second housing to allow a selectable angle of rotation between the first housing and the second housing; and
   a conductive pattern formed on a surface of the hinge housing,
   wherein the hinge structure includes a bracket disposed in the hinge housing and a mold member disposed in the hinge housing and comprising an insulating material, and
   wherein a conductive area electrically connected with the conductive pattern is disposed on the mold member
   a rotary shaft extending outside the hinge housing from the bracket;
   a first flap coupled to the rotary shaft so as to be rotatable, the first flap being fixed to an interior of the first housing; and
   a second flap coupled to the rotary shaft so as to be rotatable, the second flap being fixed to the interior of the second housing,
   wherein the mold member includes a contact surface substantially facing an extension direction of the rotary shaft and opposite the bracket,
   wherein the conductive area includes a first conductive area to which a feeding signal for supplying power to the conductive pattern is received and a second conductive area to which a ground signal is received, and
   wherein the second conductive area extends to the contact surface facing the bracket.

9. An electronic device comprising:
   a first housing including a first surface on which a display area is formed and a second surface opposite the first surface;
   a second housing including a third surface on which an input device is formed and a fourth surface opposite the third surface;
   a hollow hinge housing formed between the first housing and the second housing and having an interior space formed therein;
   a bracket assembly configured to allow a selected angle of rotation about a first direction between the first housing and the second housing, at least part of the bracket assembly being disposed in the interior space of the hollow hinge housing;
   a mold member disposed in the hollow hinge housing; and
   a terminal disposed on the mold member,
   wherein the hollow hinge housing contains a metal material comprising a slit and an insulating material disposed in the slit,
   wherein a metal area formed by the metal material and an insulating area formed by the insulating material together forming an outer surface of the hollow hinge housing,
   wherein the metal area forms an antenna configured to radiate an electrical signal,
   wherein a portion of the insulating material forms an insulating layer on an inner surface of the hollow hinge housing, wherein the insulating layer includes a groove through which part of the metal material is exposed, and wherein the terminal protrudes through the groove to fixably contact the metal area.

10. The electronic device of claim 9, further comprising:
a communication module disposed in the second housing; and
a cable extending from an interior of the hollow hinge housing to the interior of the second housing to electrically connect a conductive area and the communication module.

11. The electronic device of claim 10, wherein the conductive area includes a first conductive area for supplying power to the metal area and a second conductive area for grounding the metal area, and
wherein the second conductive area is electrically connected with the bracket assembly.

12. The electronic device of claim 9, wherein the bracket assembly includes:
a bracket disposed in the hollow hinge housing;
a rotary shaft extending outside the hollow hinge housing from the bracket in the first direction;
a first flap extending into the first housing from the rotary shaft; and
a second flap extending into the second housing from the rotary shaft.

13. The electronic device of claim 9, wherein the antenna includes:
a first antenna, at least part of which is exposed between the first surface of the first housing and the third surface of the second housing; and
a second antenna, at least part of which is exposed between the second surface of the first housing and the fourth surface of the second housing.

14. The electronic device of claim 13, wherein the electronic device includes a first state in which the first surface of the first housing and the third surface of the second housing form an angle of 0 degrees to 180 degrees and a second state in which the first surface of the first housing and the third surface of the second housing form an angle of 180 degrees to 360 degrees, and
wherein a communication module is configured to operate the second antenna as a main radiation antenna in the first state and to operate the first antenna as a main radiation antenna in the second state.

* * * * *